March 27, 1934.  F. W. FUNKE  1,952,853
PORTABLE POWER DRIVEN TOOL GRINDER
Filed Oct. 31, 1932  2 Sheets-Sheet 1

Witnesses:
L. A. Barrett
Paul F. Pitchlyn

Inventor:
Fred W. Funke

March 27, 1934.  F. W. FUNKE  1,952,853
PORTABLE POWER DRIVEN TOOL GRINDER
Filed Oct. 31, 1932  2 Sheets-Sheet 2

UNITED STATES PATENT OFFICE 1,952,853

PORTABLE POWER DRIVEN TOOL GRINDER

Fred W. Funke, Oakland, Calif.; dedicated to
the free use of the public

Application October 31, 1932, Serial No. 640,564

3 Claims. (Cl. 51—166)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public to take effect upon the granting of a patent to me.

This invention relates to improvements in grinding tools and has for its object a portable power driven tool grinder readily and quickly demountable to facilitate packing for transportation and a light weight unit suitable for use in areas remote from usual power facilities. The tool embodies the features of the ordinary tool grinder with tool rests and adjustable guards, a gasoline motor of light weight, a motor frame, vibration dampening blocks and a specially designed collapsible arbor frame. Hand and foot power grinders have been valuable tools for fire suppression work for many years. This implement combines and improves upon the valuable features of the hand and foot power grinder in a manner extremely helpful in fire-fighting work.

Figure 1:
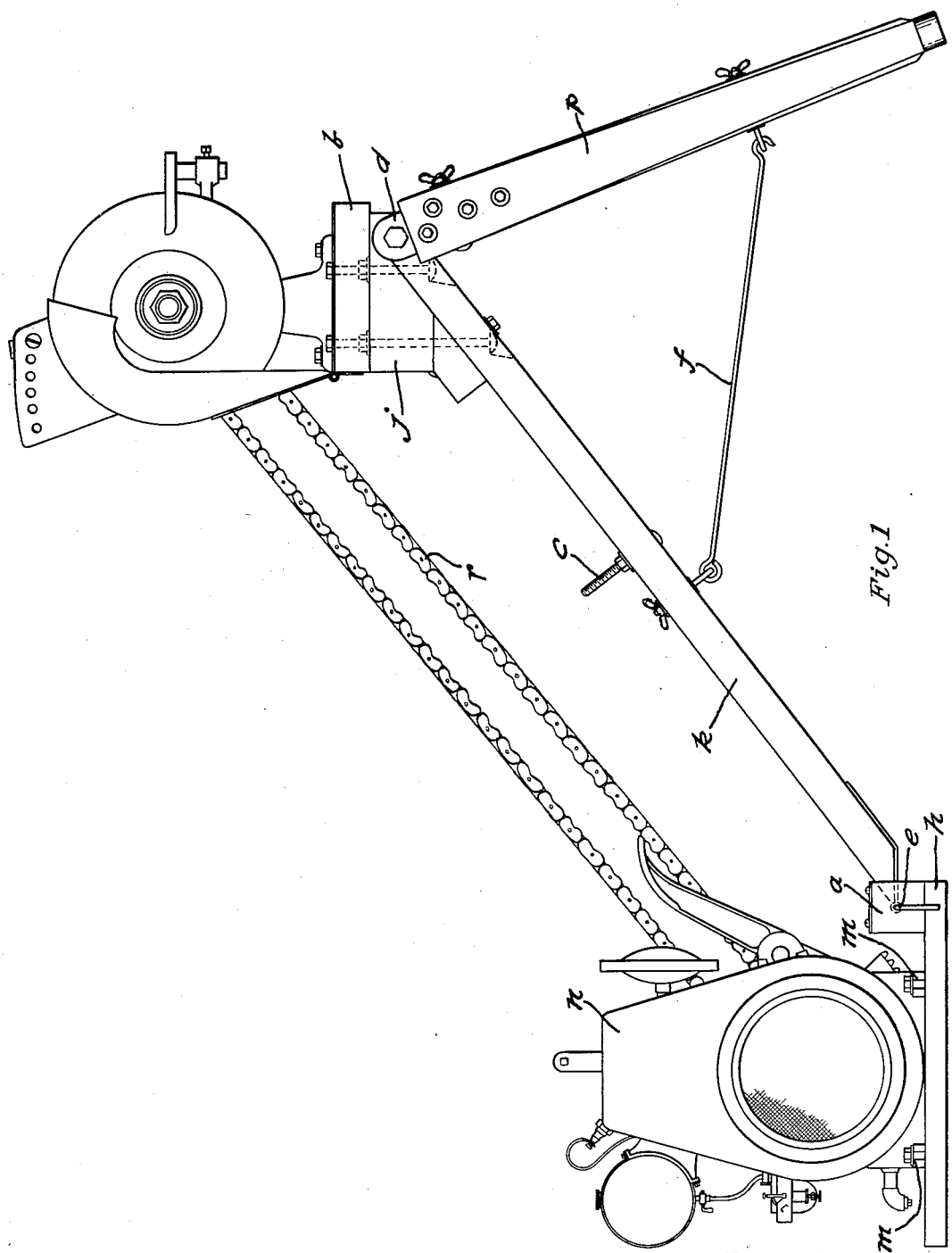
Figure 2:
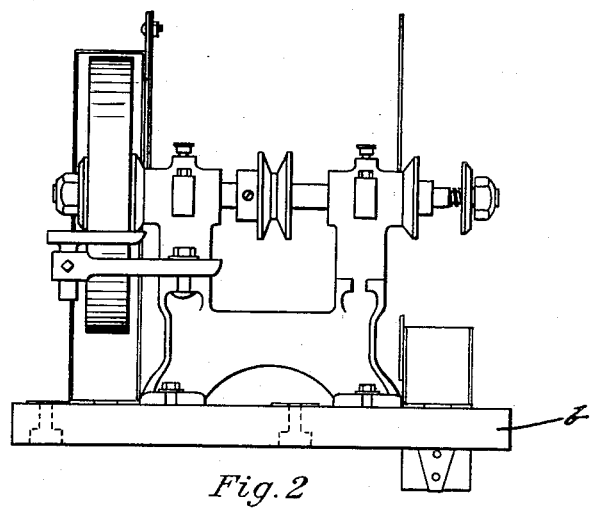
Figure 3:
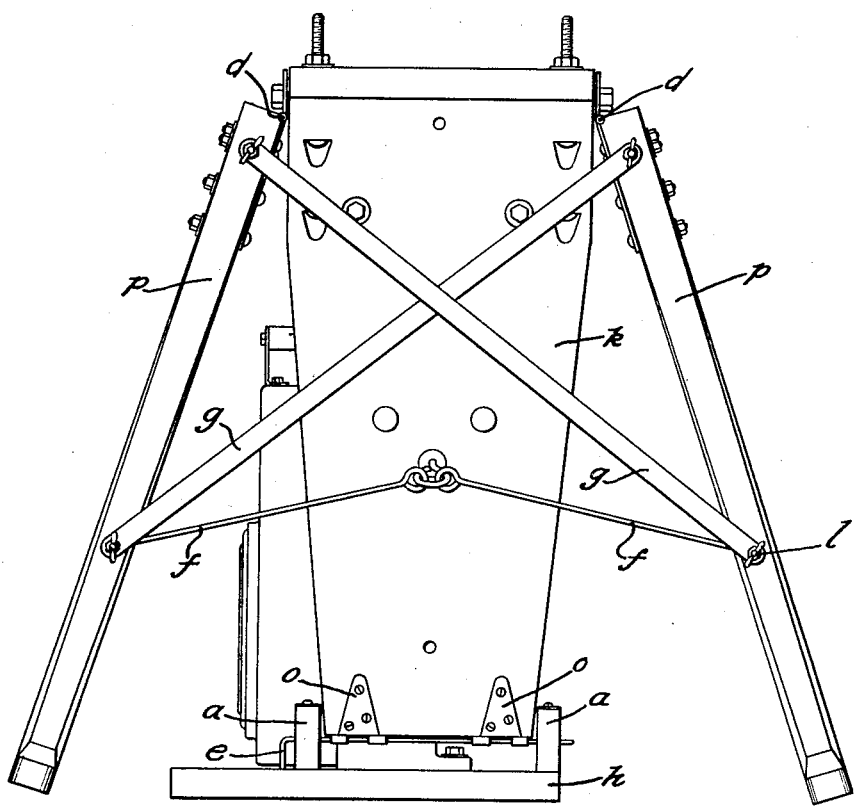

In the accompanying drawings, Figure 1 is a side elevation of the assembled tool; Figure 2 is a rear plan view of the arbor and demountable arbor base showing the tool rests and adjustable wheel guards; Figure 3 is a rear plan view of the collapsible arbor frame showing the method of attaching the arbor frame to the motor base, the method of attaching and bracing the arbor frame legs and the rear alignment of the unit.

Similar letters refer to similar parts throughout the several views.

In carrying out the invention I provide an angle iron base $h$ with flange turned down with suitable members $m$ to attach gasoline motor $n$, substantially as disclosed in Figure 1. On one end of the motor frame are mounted two rubber blocks $a$. The center of each rubber block is drilled to receive the hinge pin $e$. To the front or motor end of the arbor frame $k$ is attached two hinge loops $o$ which receive the hinge pin $e$ attaching the arbor frame to the motor base.

The arbor base mounting $j$, is permanently attached to the frame board $k$, the arbor and wheel unit $b$, being readily and quickly attached or removed from the arbor base mounting $j$. Frame supports $p$ are attached to the frame board $k$ by a hinge $d$, which permits movement in two planes. The frame supports are held in position by the tie rods $f$ providing a loose coupling. The frame supports are braced rigidly in the lateral plane by the braces $g$. The grinding wheel is revolved by a sprocket chain connecting pulleys of the power unit and the grinding wheel assembly, respectively.

The novel means for attaching the arbor frame to the motor base is very efficient in operation. This method of attachment provides a cushion connection between the motor and arbor frame as well as providing a flexible hinge contact permitting the vibration of the motor to settle the flanges of the motor frame into the earth holding the unit solidly in place and permitting the frame to adjust its angle to the position of the motor. The rubber hinge blocks prevent transmission of the vibration of the reciprocating motor piston to the grinder wheels as well as prevent grinder wheel vibration from affecting the motor and provide a connection between motor and arbor frame which can oscillate freely, prevent the vibration caused by the motor to synchronize with the vibration caused by the grinder wheels and maintain efficient alignment between driver and driven pulleys irrespective of the misalignment between grinder head and motor base.

The tool is demounted and collapsed by removing the arbor base from the arbor base mounting and mounting the arbor base unit on the threaded bolts $c$, holding the unit in place on the frame board with wing nuts. Wing nuts L are removed and the braces moved to alignment with the frame supports. The frame support tie rods are unhooked and the frame supports moved forward in alignment with the frame board. The hinge pin is withdrawn from the rubber hinge blocks and the frame is free to be stored in the packing box.

Having fully disclosed my discovery, I claim as my invention:

1. A portable power driven grinding machine comprising a metal base having downwardly turned flanges, power means rigidly attached to the upper surface of said base, two spaced rubber blocks rigidly mounted at one end of the base, each block having a perforation aligned with each other, a frame board having hinge loops at one end, a removable hinge pin passing through the perforations in the rubber blocks and the hinge loops of said frame board, hinged frame board supports attached to the other end of the frame board designed to hold that end of the frame board at a level higher than the level of the metal base, loose coupling means to secure said frame supports in a rigid position, an arbor base rigidly attached to the last mentioned end of the frame board, a grinding wheel assembly removably mounted on said arbor base, said grinding wheel being rotatably mounted, means to secure rigidly and removably said grinding wheel assembly to the arbor base and power transmission means by which said power means may rotate the grinding wheel.

2. A portable grinding machine comprising a base, power means rigidly mounted on the base, two spaced resilient blocks rigidly mounted on one end of said base, a detachable frame board, hinge means to attach one end of the frame board to the resilient blocks, means to support said frame board outwardly and upwardly from the base, a detachable grinding wheel rotatably mounted on the other end of the frame board and power transmission means connecting the power means and the grinding wheel.

3. A portable grinding machine comprising a base having downwardly turned flanges, power means rigidly mounted on the base, a frame extending outwardly and upwardly from said base, resilient means to removably and pivotally secure one end of the frame to the base, a revolvable grinding wheel detachably mounted on the other end of said frame and power transmission means associated with the power means and the grinding wheel by which said wheel is revolved.

FRED W. FUNKE.